Aug. 29, 1961

E. K. KAPRELIAN 2,997,922

LIGHT VALVE

Filed April 24, 1958

*Edward K. Kaprelian*
INVENTOR.

United States Patent Office 2,997,922
Patented Aug. 29, 1961

2,997,922
LIGHT VALVE
Edward K. Kaprelian, 29 Riveredge Road,
Red Bank, N.J.
Filed Apr. 24, 1958, Ser. No. 730,654
3 Claims. (Cl. 88—61)

This invention relates to the control of the passage of light through an optical shutter device. More specifically the invention pertains to a method and apparatus for electrically controlling the passage of light through closely spaced optical elements by changing the spacing therebetween.

One of the objects of this invention is to provide a shutter of large aperture.

Another of the objects of the invention is to provide a shutter of very high speed.

Figure 1:
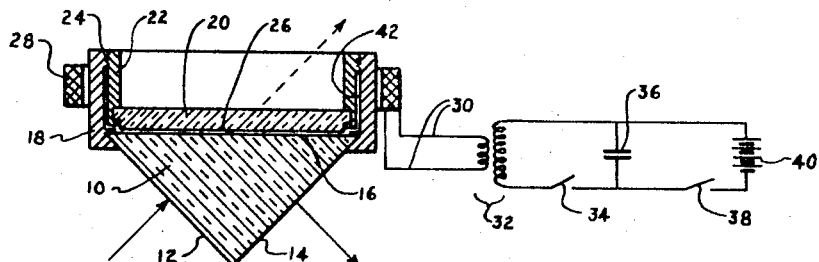
Figure 2:
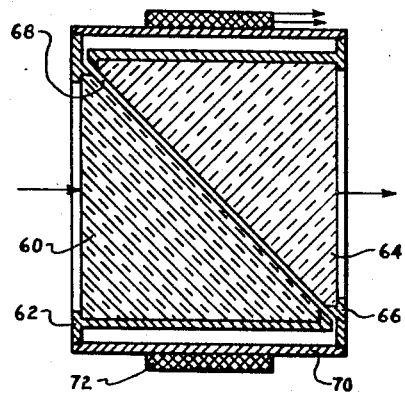
Figure 3:
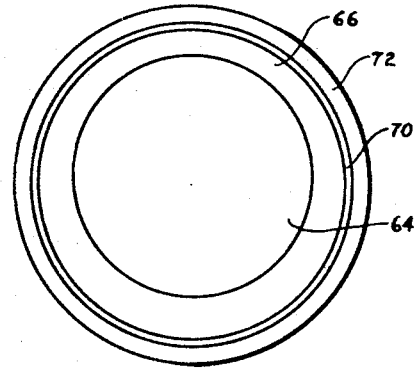

These and other objects of the invention will become apparent from the specification and the drawing in which FIG. 1 shows in elevational cross-section a shutter employing a magnetostrictive operating member FIG. 2 shows in elevational cross-section another arrangement in which operation depends upon magnetostrictive action FIG. 3 is an end view of the shutter of FIG. 2

Figure 4:
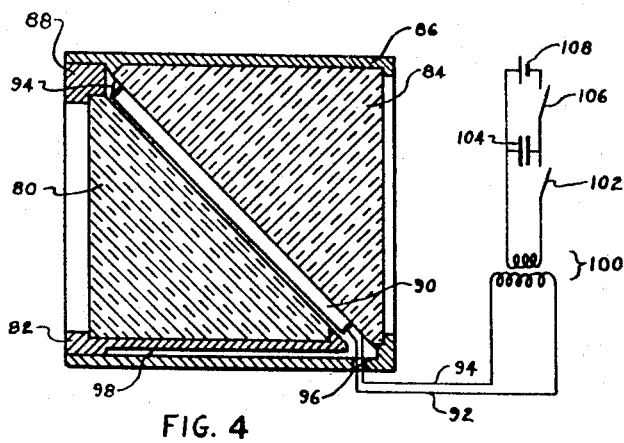

FIG. 4 shows in elevational cross-section a shutter employing piezo electric action.

It is well known in optics that total reflection will occur for light rays within a material of higher index of refraction at its interface with a material of lower index of refraction as long as the angle of incidence of the light rays exceeds the critical angle. Thus with an ordinary right angle prism in air light entering one of the two faces which are at right angles to each other is totally reflected at the internal surface of the hypotenuse. It is also known that this behavior is unchanged provided there is at least a one wavelength thick film of air between the hypotenuse of the prism and a glass surface in air, spaced away from parallel to the hypotenuse. When, however, a glass surface is brought closer than one wavelength distance from the hypotenuse of the prism light begins to pass through the hypotenuse of the prism, through the air space, and into the second glass surface. When the air space between the two glass surfaces is less than one-eighth wavelength in thickness the transmission of light through the air space is substantially 100% complete. It is upon this principle that the present invention is based.

As shown in FIG. 1 a prism 10, preferably of high refractive index, and having right angle faces 12 and 14, and hypotenuse 16, is held in a frame 18. Frame 18 is preferably made of brass or non-magnetic stainless steel, and is provided at its upper end with threads 24 into which is screwed a sleeve 22 of nickel or other magnetostrictive material spaced from frame 18 as at 42. Sleeve 22 holds at its lower end a polished, flat plate of glass 20, spaced from hypotenuse 16 as at 26 and parallel thereto. The initial spacing is $1/10$ wavelength of light or less. It is essential that surface 16 and the bottom surface of the glass plate be flat to at least $1/20$ wavelength of light. An electrical coil 28 surrounds the frame 18 and sleeve 22 as shown and connects through leads 30 to the secondary of a transformer 32. A switch 34 connects the primary of the transformer to a capacitor 36 which is connected through switch 38 to battery 40. The air space 26 between the prism and the plate can be evacuated by suitable connection into space 42 if desired. To prevent pressure distortion of plate 20 the volume above the top of the plate and within sleeve 22 should also be evacuated; in this case a cover plate, not shown, would seal off the top of the sleeve.

In the normal, closed condition of the shutter, space 26 is $1/10$ wavelength or less in thickness and light entering face 12 passes out of the prism into space 26 and through plate 20. The small amount of light normally reflected back into the prism from the top surface of plate 20 is reduced to a minimum by the use of multiple layer low reflection coatings. To operate the shutter, capacitor 36 is first charged through switch 38. Switch 34 is then closed, and capacitor 36 discharges into transformer 32 which results in the creation of a momentary flux within coil 28. Magnetostrictive sleeve 22 contracts for a brief interval of time, lasting from $1/1000$ second to $1/10,000$ second, and increases gap 26 to more than a wavelength of light. Surface 16 becomes totally reflecting and light entering face 12 is reflected out of face 14 into the optical system, camera shutter or the like. Gap 26 is immediately reduced to its original small width and light is no longer reflected from surface 16.

The amount of power required to achieve shutter action is relatively small. For heat treated nickel a contraction of 20 micro inches is achieved with 250 ampere turns and a one inch sleeve length.

FIGS. 2 and 3 show another shutter magnetostrictive in which two prisms are employed. Whereas the shutter of FIG. 1 passes useful light by means of reflection, the modification of FIG. 2 passes useful light by transmission, thereby avoiding the problems arising from unwanted reflections when the shutter is in "closed" condition.

A prism 60 is held in a frame 62 its hypotenuse being positioned parallel to and spaced away from the hypotenuse of a prism 64 which is retained in a frame 66. A sleeve 70 of magneto-strictive material positions the two frame members in the desired arrangement by means of threads, as shown, or the equivalent. An electrical coil 72 surrounds sleeve 70. The space 68 between the prisms is preferably evacuated to avoid air turbulence which may affect good imagery and in addition can cause disturbing migration of small foreign particles which may remain within the shutter cavity.

Coil 72 is connected to a suitable operating circuit similar to that employed in FIG. 1. Closing of the tripping switch results in a momentary closing of gap 68 and light previously reflected downwardly by the hypotenuse face of prism 60 now passes through and out of prism 64 into the optical system or camera, not shown. The edge surfaces of prism 60 are blackened by any one of a number of processes well known in the art to prevent unwanted reflections.

The modification shown in FIG. 4 depends upon the behavior of a piezo electric crystal for its operation. A prism 80 is held in a cell 82, its hypotenuse face held parallel to a prism 84 in cell 86 by means of suitable connection as by a force fit at the cylindrical surface 88 between the two cells. A piezo electric crystal 90 is cemented to the hypotenuse face of one of the prism by means of a transparent, flexible, resinous cement, or it may be held without cement, against the hypotenuse face by means of suitable spring means, not shown. A pair of leads 92 and 94 are attached to two opposite edges of the crystal, which is prefereably of Rochelle salt, so cut as to expand in a direction normal to the axis of the applied field. The leads pass out of cell 86 through an opening 96 which is suitably sealed by any of the usual means, not shown, after the air space between the prisms and within the cells has been evacuated.

Leads 92 and 94 connect to the secondary of transformer 100, the primary of which connects through switch 102 to capacitor 104. Switch 106 connects capacitor 104 to battery 108 or other suitable power source. In operation charged capacitor 104 is discharged into the primary of transformer 100 by closing switch 102. The voltage surge in the secondary winding appears at the ends of crystal 90, causing it to expand transversely of the voltage axis and to bridge the gap between the two prisms. This action may last for 1/10,000 second or less, depending upon the electrical characteristics of the circuit, and during this brief time light passes through prism 80, crystal 90 and prism 84 into the optical system or camera lens, not shown.

The thickness of the Rochelle salt crystal may vary from 1 to 3 millimeters, and the electrical potential required for operation is between 30 volts and 90 volts. Obviously other piezo electric crystals can be used, although Rochelle salt possesses a high expansion sensitivity which eliminates the need for high voltages required with other materials such as quartz.

I claim:

1. A light shutter for controlling the transmission of light therethrough, comprising a light-tight frame member having an opening at each of its opposite ends, a first right angle prism supported within said frame member and having a right angle face completely filling one of said openings and facing outwardly therefrom and acting as the entrance window for accepting the light to be controlled, the opposite hypotenuse face being disposed within said frame member and receiving said accepted light; a second right angle prism supported within said frame member and having a right angle face facing outwardly of and completely filling the second of said openings and acting as the exit window for the light to be controlled, the opposite hypotenuse face of said second prism being disposed within said frame member and in parallel relation to the hypotenuse face of said first prism and spaced therefrom a distance of more than one wavelength of light and less than six wavelengths of light whereby light entering said first prism is totally reflected at the hypotenuse of said first prism without entering the hypotenuse face of said second prism; and electrically actuated means for reducing the space between said two hypotenuse faces to less than one-tenth wavelength of light whereby light accepted by the entrance window face of said first prism is transmitted along a substantially straight optical path through said first and second prisms and emerges through the exit window face of said second prism.

2. A light shutter as claimed in claim 1, said electrically actuated means comprising a magnetostrictive member integral with said frame member, an electrical coil acting on said magnetostrictive member, and circuit means for energizing said coil with an electrical pulse.

3. A light shutter for controlling the transmission of light therethrough comprising a light-tight frame member having an opening at each of its opposite ends, a first right angle prism supported within said frame member and having a right angle face completely filling one of said openings and facing outwardly therefrom and acting as the entrance window for accepting the light to be controlled, the opposite hypotenuse face being disposed within said frame member and receiving said accepted light; a second right angle prism supported within said frame member and having a right angle face facing outwardly of and completely filling the second of said openings and acting as the exit window for the light to be controlled, the opposite hypotenuse face of said second prism being disposed within said frame member and in parallel relation to the hypotenuse face of said first prism and spaced therefrom; a plane parallel piezoelectric crystal supported by and coextensive with the second of said hypotenuse faces, the space between said crystal and the first hypotenuse face being more than one wavelength of light and less than six wavelengths of light whereby light entering said first prism is totally reflected at the hypotenuse face of said first prism without entering the crystal or the hypotenuse face of said second prism; and means for applying an electrical potential to said crystal to reduce the space between said first hypotenuse and said crystal to less than one-tenth wavelength of light whereby light accepted by the entrance window face of said first prism is transmitted along a substantially straight optical path through said first and second prisms and emerges through the exit window face of said second prism.

References Cited in the file of this patent

UNITED STATES PATENTS

| 2,455,763 | Harrison | Dec. 7, 1948 |
| 2,508,098 | Chilowsky | May 16, 1950 |
| 2,534,846 | Ambrose et al. | Dec. 19, 1950 |
| 2,565,514 | Pajes | Aug. 28, 1951 |

FOREIGN PATENTS

| 187,271 | Great Britain | Oct. 10, 1922 |
| 633,060 | Germany | July 18, 1936 |